J. D. SCHAKEL.
BRAKE MECHANISM FOR ELEVATOR SYSTEMS.
APPLICATION FILED JAN. 29, 1918.
1,358,339.
Patented Nov. 9, 1920.
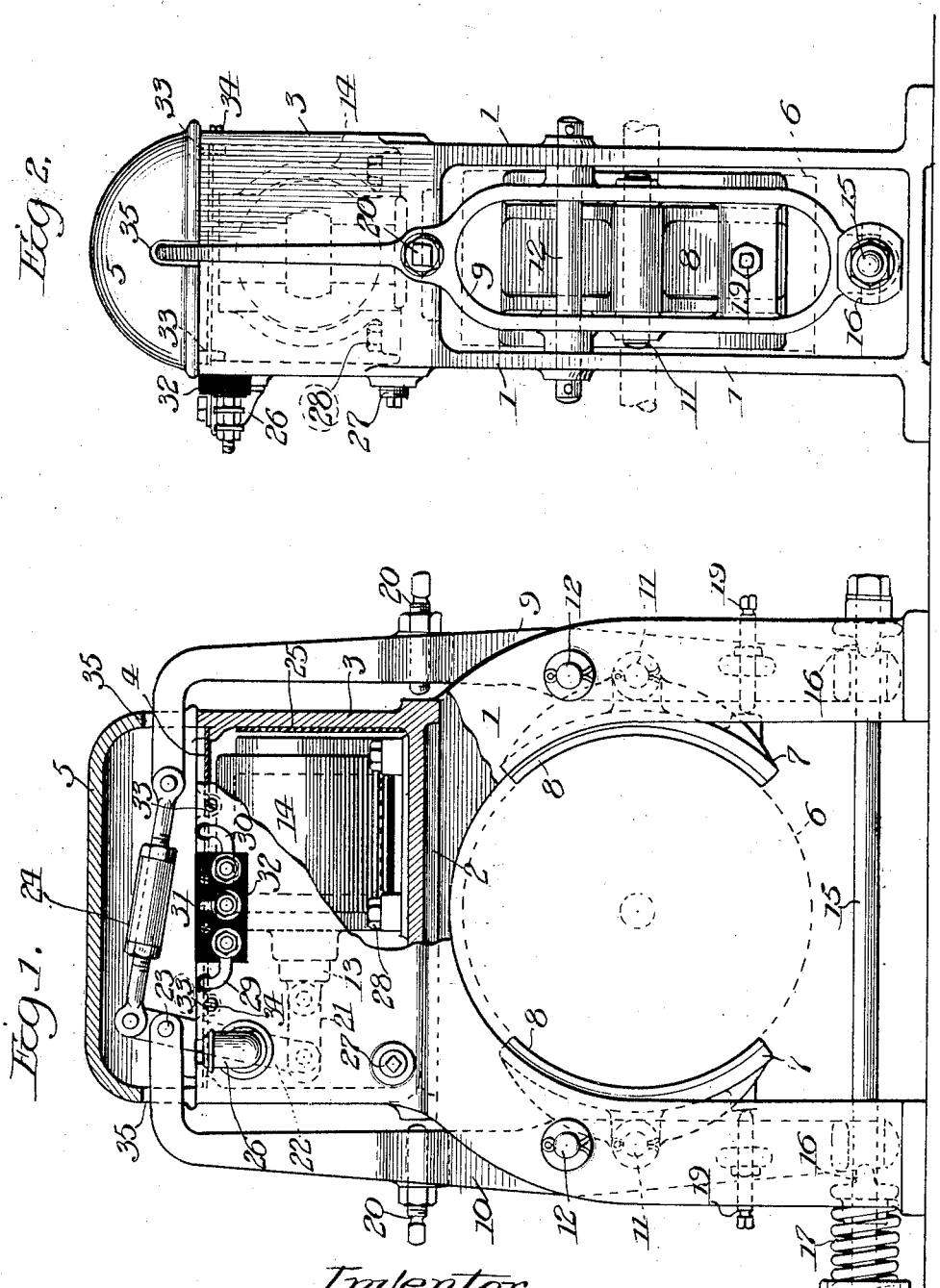
Inventor
Jacob D. Schakel

UNITED STATES PATENT OFFICE.

JACOB D. SCHAKEL, OF CHICAGO, ILLINOIS, ASSIGNOR TO ELEVATOR COMPANY OF AMERICA, OF CHICAGO, ILLINOIS.

BRAKE MECHANISM FOR ELEVATOR SYSTEMS.

1,358,339.     Specification of Letters Patent.     Patented Nov. 9, 1920.

Application filed January 29, 1918. Serial No. 214,277.

*To all whom it may concern:*

Be it known that I, JACOB D. SCHAKEL, a citizen of the United States, residing at Chicago, in the county of Cook and State of Illinois, have invented a certain new and useful Improvement in Brake Mechanism for Elevator Systems, of which the following is a full, clear, concise, and exact description, reference being had to the accompanying drawings, forming a part of this specification.

My invention relates to brake mechanism for hoisting systems and has for its object the provision of improved mechanism of this kind. The mechanism of my invention contemplates a brake drum combined with brake shoes wherein the brake shoes unless actuated by the control mechanism are acting to brake the drum.

My invention contemplates the provision of constructional features whereby I obtain a floating brake shoe construction together with an easy adjustment of the brake shoes and their supporting mechanism.

My invention also contemplates a horizontally arranged solenoid and plunger connected preferably by means of links with the brake arms. My invention further contemplates means whereby the armature stroke may be adjusted together with other means for adjusting the proper position of the brake levers and their coöperating mechanism so as to get simultaneous and effective actuation. The solenoid of this structure is so arranged that it is operable by means of alternating current and to avoid the humming and heating effect the solenoid and its attendant parts are mounted in an oil container wherein the solenoid and its parts are submerged under oil.

I will explain my invention more in detail by referring to the accompanying drawing illustrating one embodiment thereof, in which—

Figure 1 is a side view of my improved brake structure, certain portions thereof being broken away more clearly to reveal features of construction, and Fig. 2 is an end view thereof.

My improved device consists of a bifurcated horse shoe shaped framework 1 having its top portion 2 provided with an oil container 3. The oil container has a closure 4 and is surmounted by a cover plate 5. The brake drum is indicated by dotted lines at 6 and is in coöperative relation with brake shoes 7, 7. These brake shoes have their faces provided with a suitable heat, water and oil proof lining 8, this lining being in direct contact with the drum 6. The brake shoes are pivotally mounted upon brake levers 9 and 10 through the agency of bolts 11, 11. The levers 9 and 10 are respectively pivotally mounted in the framework 1 through the agency of the shafts 12, 12. The upper extremities of these brake levers 9 and 10 are controlled by the plunger 13 of the solenoid 14. The lower extremities of these brake levers are resiliently pressed toward each other through the agency of the rod 15 which passes through both of the brake levers. This rod 15 has bearing lugs 16, 16, impinging against the outer faces of the brake levers, and the pressure with which the lower extremities of the brake levers are forced toward each other is dependent upon the spring 17, this pressure being regulated by the nuts 18. The spring 17 controls the pressure exerted by the brake shoes 7, 7, upon the drum 6, and unless the upper extremities of the brake levers 9 and 10 are forced toward each other by the plunger 13, the brake shoes 7 are exerting a braking influence upon the brake drum 6 in accordance with the pressure exerted by the spring 17. Brake levers 9 and 10 also carry adjusting screws 19 which are adjusted in a manner to hold the brake shoes in a symmetrical position so as to equalize the braking influence throughout their entire braking surface. Above the shafts 12 the brake levers 9 and 10 are likewise provided with adjustable stops 20, 20, which control the degree of movement inward permitted for the upper extremities of these brake levers. In order to cause an inward movement of the brake levers and thus to release the brake shoes, I pivotally mount a link 21 upon the plunger 13, this link pivotally carrying a second link 22. The end of the link 21 nearest the casing is extended somewhat beyond its connection with the link 22. This extension is brought in contact with the casing 3 to set the plunger 13 to insure its proper stroke. The link 22 has pivotal connection with the brake lever 10 through the agency of the stud or bolt 23. The link 22 is likewise linked to the upper extremity of the brake lever 9 through the agency of the turn buckle 24.

It will thus be apparent that as the plunger 13 moves to the right (Fig. 1) that the upper extremities of the brake levers 9 and 10 approach each other, thereby releasing the brake shoes 7 from engagement with the brake drum 6. The turn buckle 24 provides facilities for properly adjusting the position of the plunger 13 to insure the proper stroke of the plunger 13 and to compensate for the wear of the parts, so that the solenoid will exert its full pulling stroke each time it is operated.

The oil container 3 has at its right hand face a cushion plate 25 against which the plunger 13 may strike, this cushion preventing noise should the right hand extremity of the plunger strike the casing of the oil container 3. The oil container 3 has an intake 26 through which the oil may be introduced therein and has an outlet 27 to permit withdrawal of the oil. The solenoid 14 is bolted to the interior of the oil container by the bolts 28 as readily apparent. The cover plate 4 has an opening through which the link 22 may project into the interior of the oil container and the cover plate likewise has holes to permit the conductors 29 and 30 to enter the interior thereof, these conductors being connected to the solenoid to complete the electric circuit thereto. These conductors 29, 30 and 31 terminate upon the terminal board 32 which is mounted exteriorly of the oil container as shown so that connection may be made to the solenoid. The cover plate 5 has downwardly extending lugs 33 by virtue of which it is held in place, screws 34 coöperating with said lugs for the purpose indicated. The cover plate 5 has openings 35 to permit entry of the brake rods 9 and 10. The horizontal mounting of the solenoid 14, together with its plunger, permits a very compact and efficient structure and permits the proper operation under oil of these parts.

It will also be apparent that by reason of the structure outlined all of the parts are susceptible of complete adjustability to thereby confine them to their proper positions.

From what has been thus described the nature of my invention will be readily clear to those skilled in the art. It will also be apparent that modifications may be made within the scope of the appended claims, without departing from the spirit of my invention.

Having however thus described one form which my invention may take, what I claim as new and desire to secure by Letters Patent is:

1. A brake apparatus of the character described comprising a brake drum, a framework, centrally pivoted brake levers carried by said framework, brake shoes carried by said brake levers, a spring to move the shoes against the drum, an oil containing casing mounted upon said framework, a solenoid and a plunger within the casing for operating the brake levers, and a cushion in the casing at one end of the plunger, against which the plunger may strike.

2. A brake apparatus of the character described comprising a brake drum, a framework, centrally pivoted brake levers carried by said framework, stops on said levers adapted to engage the frame work to limit movement of the levers, brake shoes carried by said brake levers, a spring acting on one end of the levers to move the shoes against the drum, an oil containing casing mounted upon said framework, and a horizontally mounted solenoid and a single plunger within said casing connected to the other end of said levers for operating both of said brake levers.

3. A brake apparatus of the character described comprising a brake drum, a framework, brake levers pivoted between their ends carried by said frame work, brake shoes carried by said brake levers, adjustable resilient means tending normally to press said brake shoes against said drum, adjustable stops on said levers adapted to engage the framework to limit the movement of the shoes away from the drum, adjustable screws on said levers to hold the brake shoes in symmetrical position on the levers, and a horizontally mounted solenoid having a single plunger for operating both of said brake levers.

4. A brake apparatus of the character described comprising a brake drum, a framework, centrally pivoted brake levers carried by said framework, brake shoes carried by said brake levers, adjustable resilient means acting on one end of the levers and tending normally to press said brake shoes against said drum, adjustable stops on said levers adapted to engage the framework to limit the movement of the shoes away from the drum, an oil containing casing mounted upon said framework, and a horizontally mounted solenoid having a single plunger arranged within said casing, said plunger having means connected to the other end of said levers for operating both of said brake levers.

5. A brake apparatus of the character described comprising a brake drum, a framework, centrally pivoted vertical brake levers carried by said frame work, brake shoes carried by said brake levers below their pivots and adapted to swing relatively to the drum, adjustable means carried by said brake levers to aline said brake shoes, means to limit the swinging of said shoes, an oil containing casing mounted upon said framework, a solenoid and a single plunger within said casing having means for operating both of said brake levers, and a cushion in said casing at one end of the plunger against which the plunger may strike.

6. A brake apparatus of the character described comprising a brake drum, a framework, centrally pivoted vertical brake levers carried by said framework, brake shoes carried by said brake levers below their pivots and adapted to swing relatively to the drum, adjustable means carried by said brake levers to aline said brake shoes, a spring to move the shoes into contact with the drum, an oil containing casing mounted upon said framework, a horizontally mounted solenoid and a plunger within said casing connected to the upper ends of said levers for operating both of said brake levers, and means to limit the movement of said brake levers under the action of said solenoid.

7. A brake apparatus of the character described comprising a brake drum, a framework, centrally pivoted brake levers carried by said framework, brake shoes carried by said brake levers adjacent their pivots, adjustable means carried by said brake levers to aline said brake shoes, adjustable resilient means connected to the free ends of said levers beyond said shoes and tending normally to press said brake shoes against said drum, an oil containing casing mounted upon said framework, a solenoid and a plunger within said casing connected to the other free ends of said levers for operating both of said brake levers, a cushion in the casing at one end of the plunger and means to limit the movement of the plunger toward the cushion.

8. A brake apparatus of the character described comprising a brake drum, a framework, centrally pivoted brake levers carried by said framework, brake shoes carried by said brake levers, adjustable means carried by said brake levers to aline said brake shoes, a rod connected to one of said levers, a spring on said rod tending normally to press said brake shoes against said drum, an oil containing casing mounted upon said framework, a horizontally mounted solenoid and a single plunger within said casing having means for operating both of said brake levers, a cushion in the casing at one end of the plunger and means to limit the movement of the plunger toward the cushion.

9. A brake apparatus of the character described comprising a brake drum, a framework, centrally pivoted brake levers carried by said framework, brake shoes carried by said brake levers, a rod connecting the lower ends of said levers, a spring on said rod tending to move the lower ends of the levers toward each other, and the shoes against the drum, a solenoid having a single plunger for operating both of said brake levers, a link connecting the plunger to one of said levers and a turnbuckle connecting the link to the other of said levers for adjusting said brake levers relative to said plunger.

In witness whereof I hereunto subscribe my name this 18th day of January, A. D. 1918.

JACOB D. SCHAKEL.